April 13, 1954   L. P. MIGNY   2,675,225
SPRING WASHER
Filed March 17, 1949

INVENTOR
LOUIS PIERRE MIGNY

By Linton and Linton
ATTORNEYS

Patented Apr. 13, 1954

2,675,225

UNITED STATES PATENT OFFICE 2,675,225

SPRING WASHER

Louis Pierre Migny, Paris, France

Application March 1, 1949, Serial No. 79,089

Claims priority, application France
September 1, 1948

2 Claims. (Cl. 267—1)

The present invention relates to spring washers known as "Belleville washers" commonly used as springs. Such a washer consists of a ring member the inner and outer faces of which are constituted by parallel conical surfaces, the radial section being a rectangle or a parallelogram.

When a washer of this known type supported by a horizontal plate A is surmounted by a plate B which transmits a load thereto similar to the washer $m$ shown in Fig. 2, each radial section assumes a certain inclination to the horizontal direction. The minor base of washer $m$ contracts, while its major base dilates.

Each elemental of the washer is subjected to a load P applied to the circular edge $g$ and flat surface A exerts upon the same sector a reaction R. When the washer has assumed its position of equilibrium force R is equal to P and of opposite direction and the torque P, R is equal to the torque of the resilient forces acting upon the same sector, the value of which torque is closely related to the distortion and thence to the set of the spring.

During the distortion load P and reaction R remain applied to the same points $g$ and $h$, respectively, the horizontal spacing of which undergoes no important change. When load P increases experiments have shown that deflection $f$ varies substantially proportionally and the curve giving the variation of $f$ as a function of P has a shape very similar to a straight line, as shown in Fig. 1.

Now in many applications it may be advantageous to use springs the set of which varies as a function of the load according to a law which deviates considerably from proportionality.

This invention contemplates providing a spring washer following such a law thanks to a suitable determination of the adopted outlines for the inner and outer surfaces of the washer.

The washer according to the invention consists in a ring member limited internally and externally by revolution surfaces and the meridian line of at least one of said surfaces comprises a convex portion so that the points of application of the load and reaction come nearer to one another during the distortion of the washer and thence the deflection increase is more and more reduced in proportion as the load increases.

In the accompanying drawings

Figure 2:
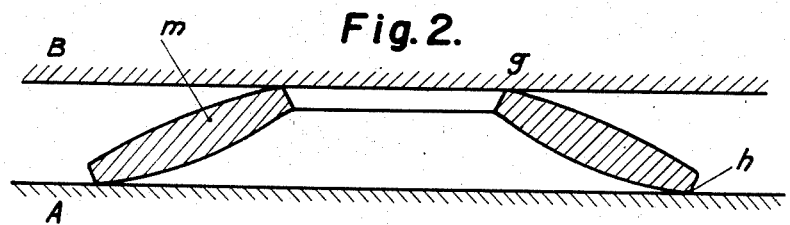
Figs. 2 and 3 are sectional views showing before and after the distortion a washer in which the radial section is biconvex.
Figure 3:
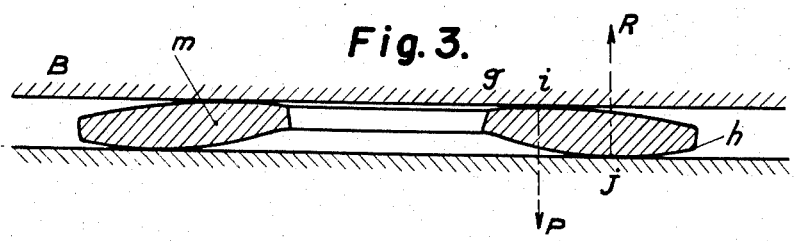

In the embodiment according to Fig. 2 each radial section of washer $m$ is limited on the inner side as well as on the outer side by a convex curve.

During the distortion the wall of washer $m$ comprised between a stationary plate A and a moving plate B assumes an inclination to the horizontal direction and the contact points of the washer with the plates A and B which were at $g$ and $h$ before the distortion move on to $i$ and $j$. The spacing between the load and the reaction is thus reduced and since the torque P, R is equal and opposite to the torque of the resilient forces it results therefrom a slower variation of the deflection as a function of the load.

Figure 4:
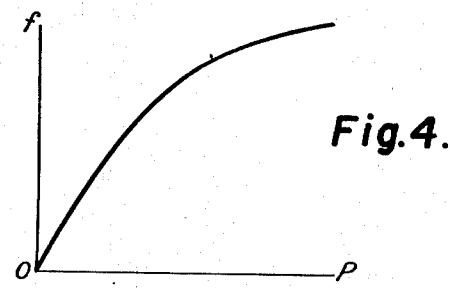
Fig. 4 shows the shape of the curve obtained with a washer according to Figs. 2 and 3.
Figure 1:
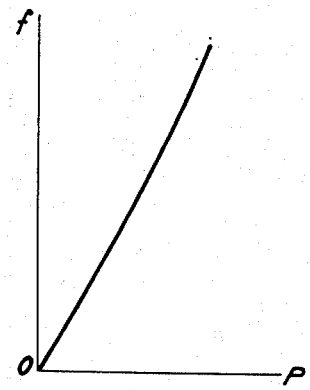
Fig. 1 represents the curve giving the variation of $f$ as a function of P.

There is thus obtained a curve having the shape shown in Fig. 4.

The variation of the set may be more or less slowed down by a suitable selection of the outline of either face of the washer.

A washer in which the set varies according to a law similar to that shown in Fig. 4 may be used in particular for the suspension of vehicles and ensures the same comfort whichever may be the transported load.

It is possible to adopt the bulged outline only for one surface of the washer, either the outer surface or the inner one.

The bulging according to the invention may besides extend only along a portion of the meridian line.

It is also possible in a washer comprising bulged portions to provide grooves or concave portions the effect of which is opposite to that of the bulged portions, which permits to obtain a deflection variation accurately corresponding to the law which is convenient for the contemplated application.

Figure 5:
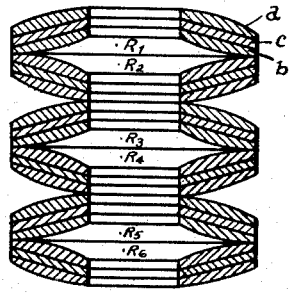
Fig. 5 is a cross sectional view of stacked convex washers each formed of a plurality of elements.

Fig. 5 shows a plurality of superimposed washers each of which are made up of three elements, namely, discs $a$, $b$ and $c$. Disc $a$ has an upper face formed with a radially extending configuration, while disc $b$ has a lower face with a radially extending configuration. The remaining faces of discs $a$, $b$ and $c$ are substantially flat and positioned together with one disc on top of the other. As a result upper and lower faces $R_1$, $R_2$, $R_3$, $R_4$, $R_5$ and $R_6$ have radially extending convex configurations similar to the washer of Fig. 2. Thus the curved faces, $R_1$ and $R_2$ for example, will upon compression of the spring rock one upon the other.

The washers according to the invention may be manufactured by turning, moulding or casting, stamping, forging or any other machining operation.

They may be made of any metal, metal alloy or plastic material of resilient type and in particular of steel, bronze, aluminum alloy, etc.

These washers may be advantageously used in a great number of applications instead of the usual springs and in particular on the vehicles or machine-tools.

It is to be besides understood that the embodiments shown have been given only as illustrations and that any minor modification may be made thereto within the scope of the invention.

I claim:

1. An improvement in spring washers comprising a washer formed having concentric inner and outer edges and its upper and lower faces each having a generally truncated conical configuration, said washer further having the upper and lower surfaces thereof between said edges each formed with a radially extending convex configuration.

2. An improvement in spring washers comprising a washer having concentric inner and outer annular edges with its upper and lower faces each having a generally truncated conical configuration, a plurality of superimposed discs forming said washer, and said washer upper and lower faces having the surfaces thereof between said edges each formed with a radially extending convex configuration.

References Cited in the file of this patent

UNITED STATES PATENTS

| Number | Name | Date |
|---|---|---|
| 2,325,193 | Nutt et al. | July 27, 1943 |

FOREIGN PATENTS

| Number | Country | Date |
|---|---|---|
| 27,376 | Great Britain | 1910 |
| 400,517 | Germany | Aug. 21, 1924 |
| 409,973 | Germany | Feb. 18, 1925 |
| 453,542 | Germany | Dec. 10, 1927 |
| 454,021 | Germany | Dec. 23, 1927 |